United States Patent
Arimura

(10) Patent No.: US 10,916,032 B2
(45) Date of Patent: Feb. 9, 2021

(54) IMAGE PROCESSING APPARATUS, IMAGE PROCESSING PROGRAM, IMAGE PROCESSING METHOD, AND IMAGE FORMING APPARATUS INCLUDING THE IMAGE PROCESSING APPARATUS

(71) Applicant: SHARP KABUSHIKI KAISHA, Sakai (JP)

(72) Inventor: Takuya Arimura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 119 days.

(21) Appl. No.: 16/232,073

(22) Filed: Dec. 26, 2018

(65) Prior Publication Data
US 2019/0206080 A1 Jul. 4, 2019

(30) Foreign Application Priority Data

Dec. 28, 2017 (JP) ................................. 2017-254083

(51) Int. Cl.
| | |
|---|---|
| *G06T 7/73* | (2017.01) |
| *G06T 3/40* | (2006.01) |
| *G06T 11/20* | (2006.01) |
| *G06T 5/00* | (2006.01) |
| *H04N 1/00* | (2006.01) |
| *G06T 5/20* | (2006.01) |

(52) U.S. Cl.
CPC ............... *G06T 7/73* (2017.01); *G06T 3/40* (2013.01); *G06T 5/003* (2013.01); *G06T 5/20* (2013.01); *G06T 11/203* (2013.01); *H04N 1/00* (2013.01); *G06T 2207/20012* (2013.01); *G06T 2207/30176* (2013.01)

(58) Field of Classification Search
CPC ................................. G06T 3/40; G06T 3/4053
See application file for complete search history.

(56) References Cited

U.S. PATENT DOCUMENTS

| | | | | |
|---|---|---|---|---|
| 2013/0182002 A1* | 7/2013 | Macciola | ............... | G06F 17/40 |
| | | | | 345/589 |
| 2015/0093046 A1* | 4/2015 | Okizaki | ............... | G06T 3/4069 |
| | | | | 382/299 |
| 2015/0339554 A1* | 11/2015 | Kawano | ............... | H04N 1/58 |
| | | | | 358/3.27 |
| 2016/0334729 A1* | 11/2016 | Suhara | ............... | H04N 1/113 |

FOREIGN PATENT DOCUMENTS

JP 2015-023445 A 2/2015

OTHER PUBLICATIONS

"Graphic Design and Print Production Fundamentals" by Collins et al., Section 6.3 (Year: 2015).*

* cited by examiner

*Primary Examiner* — Joshua L Schwartz
(74) *Attorney, Agent, or Firm* — ScienBiziP, P.C.

(57) ABSTRACT

According to the present disclosure, for example, when a line of a character as an object is to be thickened, an enlargement process is performed. Then, a correction process is performed to deform the line of the character into a moderate thickness. Moreover, when a line of a character as an object is to be thinned, a reduction process is performed. Then, a correction process is performed to deform the line of the character into a moderate thickness. Also for a hollow character as an object, a similar contour process is performed to deform the line of the hollow character into a moderate thickness.

17 Claims, 15 Drawing Sheets

FIG. 5A
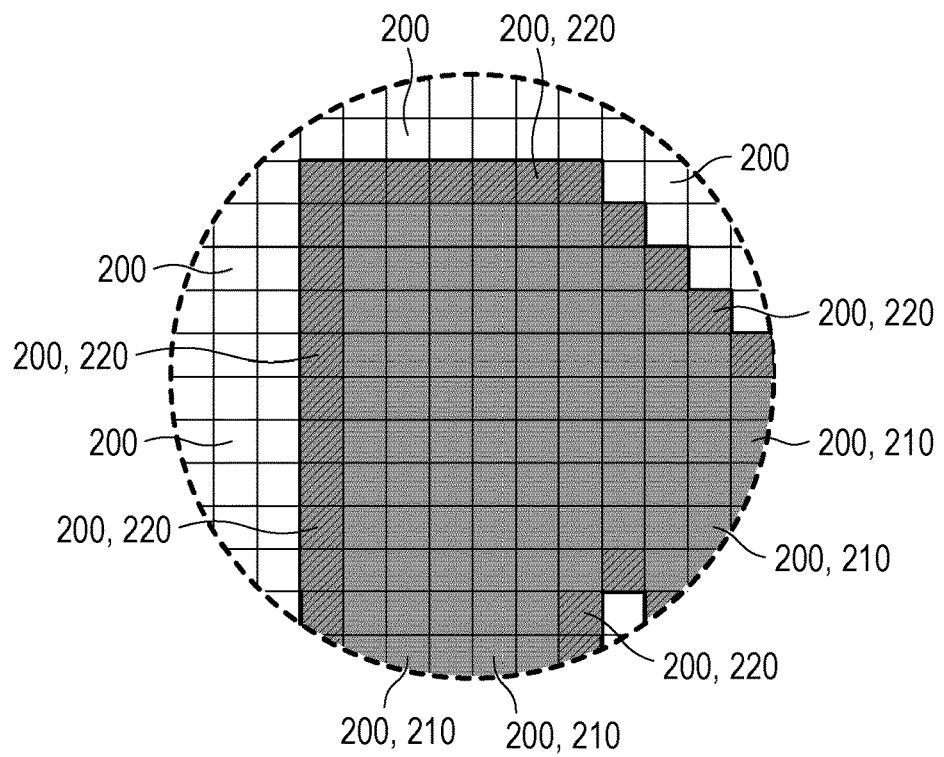
FIG. 5B
FIG. 5C
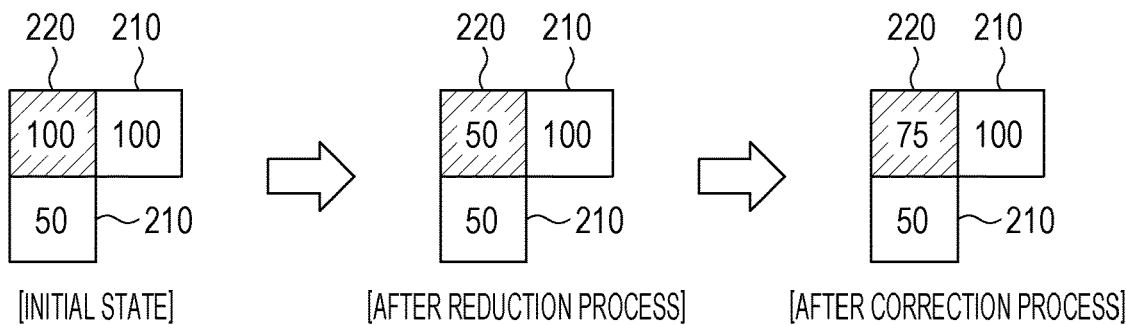
[INITIAL STATE]   [AFTER REDUCTION PROCESS]   [AFTER CORRECTION PROCESS]

[INITIAL STATE]  [AFTER REDUCTION PROCESS]  [AFTER CORRECTION PROCESS]

FIG. 8

| CORRECTION LEVEL | RATIO |
|---|---|
| −2 | 1/2 |
| −1 | 3/4 |
| 0 | 1 |
| +1 | 5/4 |
| +2 | 3/2 |

FIG. 12A

| | CONTOUR PROCESS CONTENT | | | LEGIBILITY EVALUATION RESULT | | |
|---|---|---|---|---|---|---|
| | ENLARGEMENT/ REDUCTION | CORRECTION PROCESS | CORRECTION LEVEL | LETTER | LINE | FIGURE |
| EVALUATION EXAMPLE 1-1 | ENLARGEMENT | PERFORMED | −1 | ○ | ○ | ○ |
| EVALUATION EXAMPLE 1-2 | ENLARGEMENT | PERFORMED | −2 | ○ | ○ | ○ |
| COMPARATIVE EXAMPLE 1-1 | NOT PERFORMED | NOT PERFORMED | — | × | × | × |
| COMPARATIVE EXAMPLE 1-2 | ENLARGEMENT | NOT PERFORMED | — | △ | △ | △ |

FIG. 12B

| | CONTOUR PROCESS CONTENT | | | LEGIBILITY EVALUATION RESULT | | |
|---|---|---|---|---|---|---|
| | ENLARGEMENT/ REDUCTION | CORRECTION PROCESS | CORRECTION LEVEL | LETTER | LINE | FIGURE |
| EVALUATION EXAMPLE 2-1 | REDUCTION | PERFORMED | +1 | ○ | ○ | ○ |
| EVALUATION EXAMPLE 2-2 | REDUCTION | PERFORMED | +2 | ○ | ○ | ○ |
| COMPARATIVE EXAMPLE 2-1 | NOT PERFORMED | NOT PERFORMED | — | × | × | × |
| COMPARATIVE EXAMPLE 2-2 | REDUCTION | NOT PERFORMED | — | △ | △ | △ |

FIG. 12C

| | CONTOUR PROCESS CONTENT | | | LEGIBILITY EVALUATION RESULT | | |
|---|---|---|---|---|---|---|
| | ENLARGEMENT/ REDUCTION | CORRECTION PROCESS | CORRECTION LEVEL | LETTER | LINE | FIGURE |
| EVALUATION EXAMPLE 3-1 | ENLARGEMENT | PERFORMED | −1 | ○ | ○ | ○ |
| EVALUATION EXAMPLE 3-2 | ENLARGEMENT | PERFORMED | −2 | ○ | ○ | ○ |
| COMPARATIVE EXAMPLE 3-1 | NOT PERFORMED | NOT PERFORMED | — | × | × | × |
| COMPARATIVE EXAMPLE 3-2 | ENLARGEMENT | NOT PERFORMED | — | △ | △ | △ |

FIG. 12D

| | CONTOUR PROCESS CONTENT | | | LEGIBILITY EVALUATION RESULT | | |
|---|---|---|---|---|---|---|
| | ENLARGEMENT/ REDUCTION | CORRECTION PROCESS | CORRECTION LEVEL | LETTER | LINE | FIGURE |
| EVALUATION EXAMPLE 4-1 | REDUCTION | PERFORMED | +1 | ○ | ○ | ○ |
| EVALUATION EXAMPLE 4-2 | REDUCTION | PERFORMED | +2 | ○ | ○ | ○ |
| COMPARATIVE EXAMPLE 4-1 | NOT PERFORMED | NOT PERFORMED | — | × | × | × |
| COMPARATIVE EXAMPLE 4-2 | REDUCTION | NOT PERFORMED | — | △ | △ | △ |

FIG. 13A

| | CONTOUR PROCESS CONTENT ||| LEGIBILITY EVALUATION RESULT |||
|---|---|---|---|---|---|---|
| | ENLARGEMENT/ REDUCTION | CORRECTION PROCESS | CORRECTION LEVEL | LETTER | LINE | FIGURE |
| EVALUATION EXAMPLE 5-1 | ENLARGEMENT | PERFORMED | −1 | ○ | ○ | ○ |
| EVALUATION EXAMPLE 5-2 | ENLARGEMENT | PERFORMED | −2 | ○ | ○ | ○ |
| COMPARATIVE EXAMPLE 5-1 | NOT PERFORMED | NOT PERFORMED | — | × | × | × |
| COMPARATIVE EXAMPLE 5-2 | ENLARGEMENT | NOT PERFORMED | — | △ | △ | △ |

FIG. 13B

| | CONTOUR PROCESS CONTENT ||| LEGIBILITY EVALUATION RESULT |||
|---|---|---|---|---|---|---|
| | ENLARGEMENT/ REDUCTION | CORRECTION PROCESS | CORRECTION LEVEL | LETTER | LINE | FIGURE |
| EVALUATION EXAMPLE 6-1 | REDUCTION | PERFORMED | +1 | ○ | ○ | ○ |
| EVALUATION EXAMPLE 6-2 | REDUCTION | PERFORMED | +2 | ○ | ○ | ○ |
| COMPARATIVE EXAMPLE 6-1 | NOT PERFORMED | NOT PERFORMED | — | × | × | × |
| COMPARATIVE EXAMPLE 6-2 | REDUCTION | NOT PERFORMED | — | △ | △ | △ |

FIG. 13C

| | CONTOUR PROCESS CONTENT | | | LEGIBILITY EVALUATION RESULT | | |
|---|---|---|---|---|---|---|
| | ENLARGEMENT/ REDUCTION | CORRECTION PROCESS | CORRECTION LEVEL | LETTER | LINE | FIGURE |
| EVALUATION EXAMPLE 7-1 | ENLARGEMENT | PERFORMED | −1 | ○ | ○ | ○ |
| EVALUATION EXAMPLE 7-2 | ENLARGEMENT | PERFORMED | −2 | ○ | ○ | ○ |
| COMPARATIVE EXAMPLE 7-1 | NOT PERFORMED | NOT PERFORMED | — | × | × | × |
| COMPARATIVE EXAMPLE 7-2 | ENLARGEMENT | NOT PERFORMED | — | △ | △ | △ |

FIG. 13D

| | CONTOUR PROCESS CONTENT | | | LEGIBILITY EVALUATION RESULT | | |
|---|---|---|---|---|---|---|
| | ENLARGEMENT/ REDUCTION | CORRECTION PROCESS | CORRECTION LEVEL | LETTER | LINE | FIGURE |
| EVALUATION EXAMPLE 8-1 | REDUCTION | PERFORMED | +1 | ○ | ○ | ○ |
| EVALUATION EXAMPLE 8-2 | REDUCTION | PERFORMED | +2 | ○ | ○ | ○ |
| COMPARATIVE EXAMPLE 8-1 | NOT PERFORMED | NOT PERFORMED | — | × | × | × |
| COMPARATIVE EXAMPLE 8-2 | REDUCTION | NOT PERFORMED | — | △ | △ | △ |

IMAGE PROCESSING APPARATUS, IMAGE PROCESSING PROGRAM, IMAGE PROCESSING METHOD, AND IMAGE FORMING APPARATUS INCLUDING THE IMAGE PROCESSING APPARATUS

BACKGROUND

1. Field

The present disclosure relates to an image processing apparatus, an image processing program, an image processing method, and an image forming apparatus including the image processing apparatus. Specifically, the present disclosure relates to an image processing apparatus, an image processing program, an image processing method which perform, for objects included in an image, a prescribed process on a contour section of each of the objects, and an image forming apparatus including the image processing apparatus.

2. Description of the Related Art

Japanese Unexamined Patent Application Publication No. 2015-23445 discloses an example of a technique for performing, for objects such as characters and figures included in an image, a prescribed process on a contour section of each of the objects. According to the technique disclosed in Japanese Unexamined Patent Application Publication No. 2015-23445, the prescribed process according to the type and the area of each of the objects is performed. For example, for characters, an edge enhancement process is performed such that the smaller the area of a character is, that is, the thinner the character is, the more strongly an edge section serving as the contour section of the character is emphasized. Also for figures, an edge enhancement process is performed in a similar manner such that the smaller the area of a figure is, that is, the thinner a line forming the figure is, the more strongly an edge section of the figure is emphasized.

In the edge enhancement process according to the technique disclosed in Japanese Unexamined Patent Application Publication No. 2015-23445, however, an emphasis degree of the contour section of an object may become too high, or the emphasis degree may become too low against the intension of a user. That is, a process result intended by a user may not be obtained. Moreover, there are demands for performing a prescribed process on contour sections of positive/negative-reversed objects such as outlined characters and outlined lines.

Thus, it is an aspect of the present disclosure to provide an image processing apparatus, an image processing program, an image processing method which perform, for objects included in an image, a prescribed process on a contour section of each of the object, and an image forming apparatus including the image processing apparatus to obtain a process result according to the intention of a user.

Moreover, it is also an aspect of the present disclosure to perform a prescribed process on a contour section of a positive/negative-reversed object such as an outlined character or an outlined line and to obtain a process result intended by a user.

SUMMARY

The present disclosure includes a first aspect according to an image processing apparatus, a second disclosure according to an image processing program, a third disclosure according to an image processing method, and a fourth disclosure according to an image forming apparatus.

Among them, the first aspect according to the image processing apparatus includes an object determination unit, a target pixel specifying unit, a target pixel processing unit, and a target pixel correcting unit. The object determination unit is configured to determine, for each object included in an image based on image data input to the object determination unit, a type of the object. The target pixel specifying unit is configured to specify, for the each object, pixels forming a contour section of the object as target pixels. The target pixel processing unit is configured to perform, on a pixel value of each of some or all of the target pixels, a prescribed process according to pixel values of adjacent pixels adjacent to a corresponding one of the target pixels and the type of the object to which the corresponding one of the target pixels belongs. The target pixel correcting unit is configured to correct the pixel value of each of the target pixels in accordance with the type of the object to which the corresponding one of the target pixels belongs after the prescribed process performed by the target pixel processing unit.

In the present disclosure, the second disclosure according to the image processing program is configured to cause a computer to execute an object determination procedure, a target pixel specifying procedure, a target pixel processing procedure, and a target pixel correction procedure. The object determination procedure determines, for each object included in an image based on image data input to the object determination unit, a type of the object. The target pixel specifying procedure specifies, for the each object, pixels forming a contour section of the object as target pixels. The target pixel processing procedure performs, on a pixel value of each of some or all of the target pixels, a prescribed process according to pixel values of adjacent pixels adjacent to a corresponding one of the target pixels and the type of the object to which the corresponding one of the target pixels belongs. The target pixel correcting procedure corrects the pixel value of each of the target pixels in accordance with the type of the object to which the corresponding one of the target pixels belongs after the prescribed process performed by the target pixel processing procedure.

In the present disclosure, the third disclosure according to the image processing method includes an object determining step, a target pixel specifying step, a target pixel process step, and a target pixel correcting step. The object determination step is a step of determining, for each object included in an image based on image data input to the object determination unit, a type of the object. The target pixel specifying step is a step of specifying, for the each object, pixels forming a contour section of the object as target pixels. The target pixel processing step of processing the target pixel by performing, on a pixel value of each of some or all of the target pixels, a prescribed process according to pixel values of adjacent pixels adjacent to a corresponding one of the target pixels and the type of the object to which the corresponding one of the target pixels belongs. The target pixel correction step is a step of correcting the pixel value of each of the target pixels in accordance with the type of the object to which the corresponding one of the target pixels belongs after the prescribed process performed in the processing of the target pixels.

In the present disclosure, the fourth disclosure according to the image forming apparatus includes the image processing apparatus according to the first aspect, and an image forming unit. The image forming unit is configured to form an image onto an image recording medium, the image being based on output image data by which the pixel values of the target pixels corrected by the target pixel correcting unit are reflected.

BRIEF DESCRIPTION OF THE DRAWINGS

FIG. 5A is a view illustrating an example of a character as an object in the first embodiment;

FIG. 5B is a view illustrating target pixels in a case of a reduction process in the first embodiment;

FIG. 5C is a view specifically illustrating a procedure of a contour process including the reduction process in the first embodiment;

FIG. 8 is a view illustrating a list of correction levels in a correction process in the first embodiment;

FIGS. 12A to 12D are views each illustrating an example of an evaluation result in the first embodiment; and FIGS. 13A to 13D are views each illustrating an example of evaluation results of an image formation process in the first embodiment.

DESCRIPTION OF THE EMBODIMENTS

First Embodiment

Figure 1:
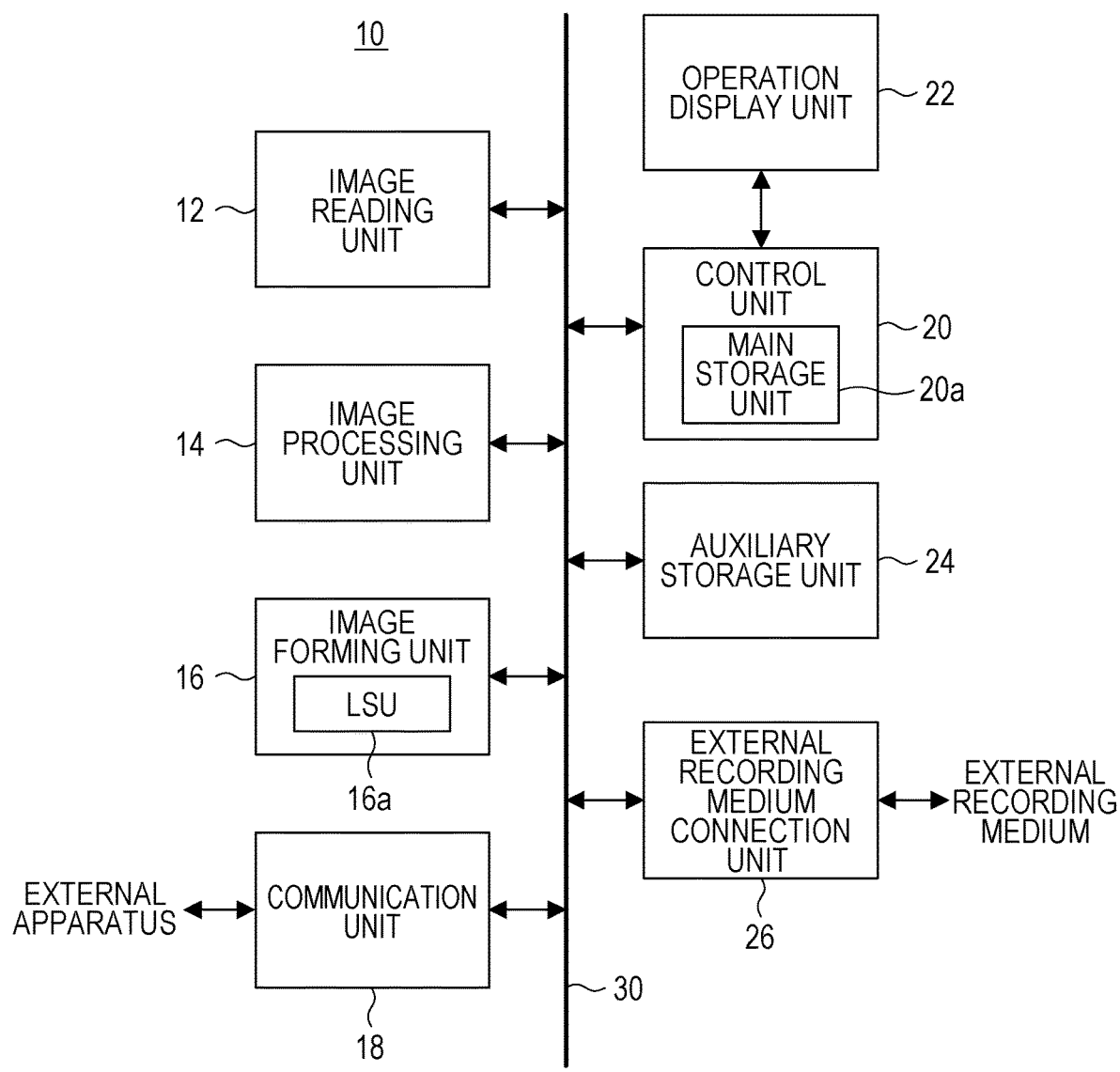
FIG. 1 is a block diagram illustrating an electrical structure of an image forming apparatus according to a first embodiment of the present disclosure.

With reference to a multi-function device 10 shown in FIG. 1, a first embodiment of the present disclosure will be described.

The multi-function device 10 according to the first embodiment includes a copy function, a printer function, a scanner function, a facsimile function, and the like. Thus, the multi-function device 10 includes an image reading unit 12 as an image reading means, an image processing unit 14 as an image processing means, an image forming unit 16 as an image forming means, and a communication unit 18 as a communication means. The multi-function device 10 further includes a control unit 20, an operation display unit 22, an auxiliary storage unit 24, and an external recording medium connection unit 26. Note that the image reading unit 12, the image processing unit 14, the image forming unit 16, the communication unit 18, the control unit 20, the auxiliary storage unit 24, and the external recording medium connection unit 26 are connected to each other via a bus 30. The operation display unit 22 is directly connected to the control unit 20 without using the bus 30.

The image reading unit 12 includes a document mounting platen, a light source, a plurality of mirrors, an imaging lens, a line sensor, and the like which are not shown. The image reading unit 12 reads an image in a document (not shown) and outputs two-dimensional image data according to the image in the document.

The image processing unit 14 includes a digital signal processor (DS) (not shown) and performs appropriate image processing on various types of image data such as image data output form the image reading unit 12. Examples of image data subjected to the image processing by the image processing unit 14 include image data based on a print job described later in addition to the image data output from the image reading unit 12. Moreover, the image processing by the image processing unit 14 includes a contour process which will be described later. The image data after the image processing performed by the image processing unit 14 is transmitted to appropriate elements of the image forming unit 16, the communication unit 18, the control unit 20, the auxiliary storage unit 24, and the external recording medium connection unit 26.

The image forming unit 16 is configured to perform an image formation process of forming an image on an image recording medium such as a sheet (not shown) by an electrophotographic system. Thus, the image forming unit 16 includes a photoreceptor drum, a charging apparatus, an exposure apparatus, a development apparatus, a transfer apparatus, a fixing apparatus, and the like which are not shown. In particular, the exposure apparatus includes a laser scanning unit (hereinafter referred to as "LSU") 26 as an exposure means. The LSU 26 irradiates the photoreceptor drum with laser light based on image data provided to the image formation process by the image forming unit 16, thereby forming an electrostatic latent image on a surface of the photoreceptor drum. Note that an output (power) of the laser light emitted from the LSU 26 is controlled based on a PWM control system. That is, the LSU 26 includes a light-emitting element (not shown) as a light emitting means configured to emit laser light. A duty ratio of a pulse signal supplied to the light-emitting element controls the output of the laser light emitted from the light-emitting element. Examples of the image data provided to the image formation process by the image forming unit 16 include image data after image processing by the image processing unit 14, image data based on a print job which will be described later, and image data received by the communication unit 18, which will be described later, from a facsimile apparatus at the other end.

The communication unit 18 performs a bidirectional communication process with an external apparatus (not shown). Examples of the external apparatus in the present embodiment include a facsimile apparatus. In this case, the communication unit 18 is connected to a facsimile apparatus serving as the external apparatus via a telephone network. Image data transmitted from the facsimile apparatus serving as the external apparatus is received by the communication unit 18 and is subjected to the image formation process by the image forming unit 16 as previously described. Moreover, examples of the external apparatus other than the facsimile apparatus include a server and a personal computer. In this case, the communication unit 18 is connected to a server, a personal computer, or the like as the external apparatus via a network such as a local area network (LAN) or the Internet. It is possible to realize the connection over the network by not only a wired system but also a wireless system such as a Wi-Fi (registered trademark) system.

The control unit 20 is a so-called control means which performs overall control of the multi-function device 10. Thus, the control unit 20 includes a central processing unit (CPU) (not shown). The control unit 20 further includes a main storage unit 20a serving as a main storage means. The main storage unit 20a includes random access memory (RAM) and read only memory (ROM) which are not shown. The conceptual configuration in the main storage unit 20a is shown in a memory map 40 in FIG. 2.

Figure 2:
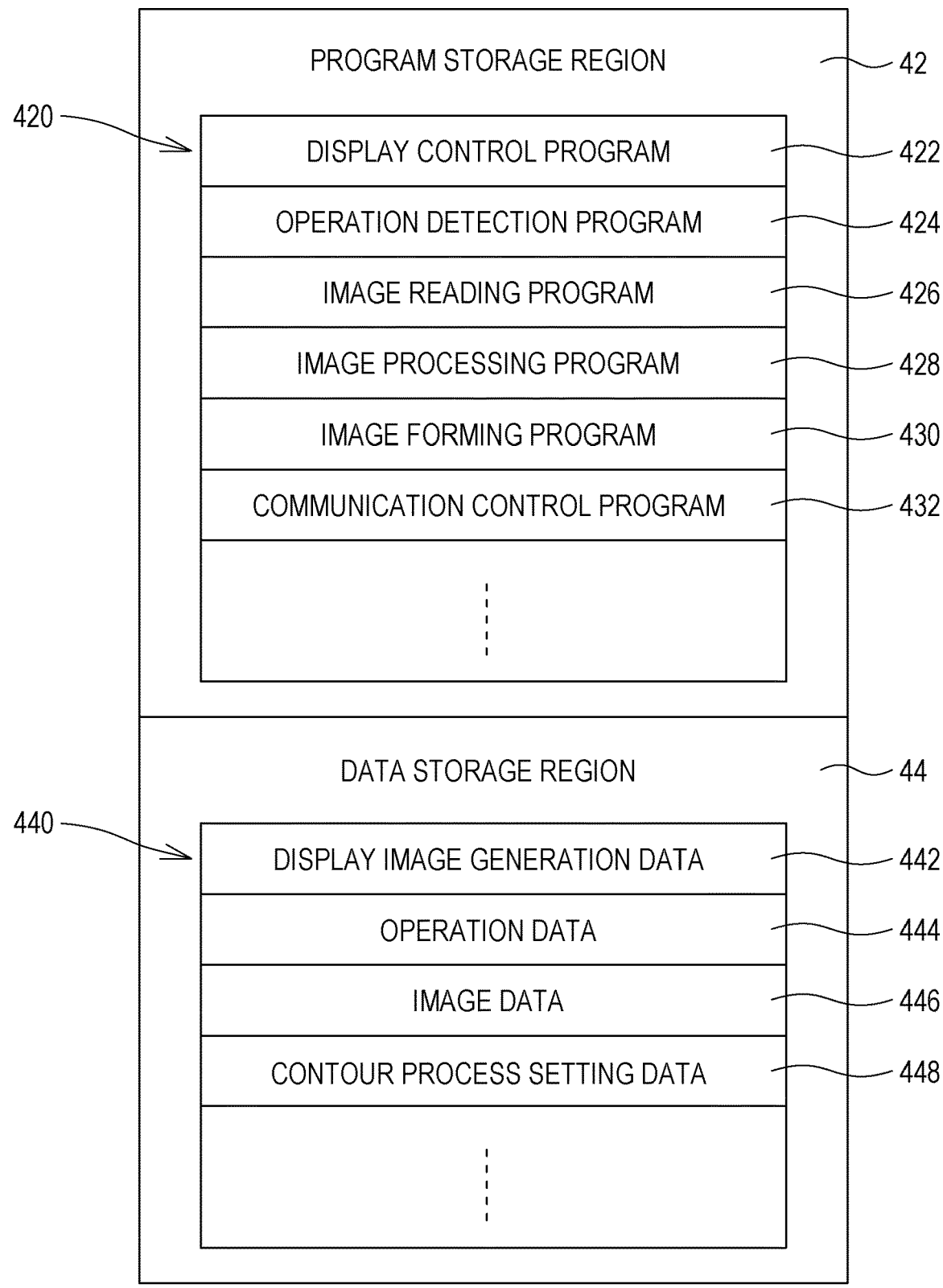
FIG. 2 is a memory map conceptually illustrating a configuration in a main storage unit in the first embodiment.

As the memory map 40 in FIG. 2 shows, the main storage unit 20a includes a program storage region 42 and a data storage region 44. The program storage region 42 of these regions stores a control program 420 for controlling operation of the CPU. The control program 420 includes a display control program 422, an operation detection program 424, an image reading program 426, an image processing program 428, an image forming program 430, a communication control program 432, and the like.

The display control program 422 among the programs is a program for generating display screen data which is used to display various types of screens such as a preview screen 100 which will be described later on a display surface of a display (which will be described later) of the operation display unit 22. The operation detection program 424 is a program for detecting a state of an operation performed by a user on a touch panel (which will be described later) of the operation display unit 22.

The image reading program 426 is a program for controlling the image reading unit 12. The image processing program 428 is a program for controlling the image processing unit 14. The image processing program 428 includes a contour process program for causing the image processing unit 14 to execute the contour process which will be described later.

The image forming program 430 is a program for controlling the image forming unit 16. The communication control program 432 is a program for controlling the communication unit 18.

In contrast, the data storage region 44 stores various types of data 440. The various types of data 440 include display image generation data 442, operation data 444, image data 446, contour process setting data 448, and the like.

Among them, the display image generation data 442 is data which is polygon data, texture data, or the like for generating display screen data corresponding to various types of screens such as the preview screen 100 (which will be described later). The operation data 546 is data denoting a state of an operation performed by a user on a touch panel (which will be described later) of the operation display unit 22. For example, the operation data 546 is data of a time series denoting a touch position (coordinate) by a user on the touch panel.

The image data 446 is various types of image data such as image data output from the image reading unit 12 and image data based on a print job which will be described later. The image data 446 is temporarily stored in the data storage region 44. The contour process setting data 448 is data relating to a set content of the contour process which will be described later.

Returning to FIG. 1, the operation display unit 22 is a touch panel-equipped display including a display (not shown) serving as a display means and a touch panel (not shown) provided to a display surface of the display. Note that display is, for example, a liquid crystal display (LCD) but is not limited to this example. An organic electroluminescence (EL) display or the like may be adopted as the display. Moreover, the touch panel is, for example, a capacitive touch panel but is not limited to this example. Another touch panel such as an electromagnetic induction touch panel, a resistive film touch panel, or an infrared touch panel may be adopted as the touch panel. Moreover, the operation display unit 22 includes a hardware switch (not shown). The hardware switch, together with the touch panel, functions as an operation reception means for receiving an operation performed by a user.

The auxiliary storage unit 24 is an auxiliary storage means including, for example, a hard disk and flash memory which are not shown. The auxiliary storage unit 24 accordingly stores, for example, various types of image data such as image data output from the image reading unit 12 and various types of data other than the image data in accordance with control by the control unit 20.

The external recording medium connection unit 26 has a connection port to which an external recording medium such as universal serial bus (USB) memory (not shown) is connectable. The external recording medium connection unit 26 is configured to transmit and receive various types of data such as image data to and from an external recording medium. Thus, for example, it is possible to load various types of data such as image data stored in the external recording medium into the multi-function device 10 and it is possible to transmit and store various types of data from the multi-function device 10 into the external recording medium.

The multi-function device 10 according to the first embodiment has a contour process function of processing, for the various types of image data such as image data output from the image reading unit 12, a contour section of each object such as a character (letter), figure, photograph, or the like included in an image based on the image data. The contour process function enables, for each object, the contour section thereof to be enlarged or reduced depending on the type of the object. Moreover, it is possible to accordingly adjust the enlargement degree and the reduction degree of the contour section so that a process result according to the intention of a user is obtained.

Figure 3A:
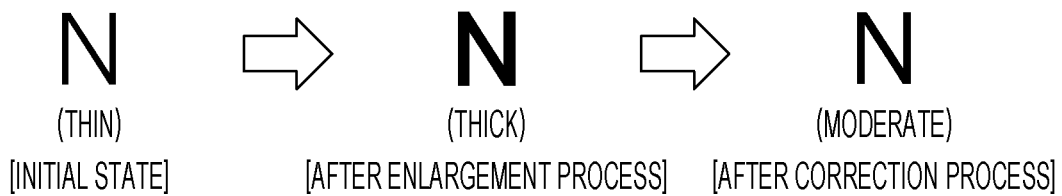
FIGS. 3A to 3D are views each illustrating a procedure of a contour process in the first embodiment.

Specifically, assume that there is a relatively thin character "N" as shown, for example, on the left in FIG. 3A. In this case, an enlargement process of enlarging the contour section of the character is performed, thereby deforming (shaping) the thin character shown on the left in FIG. 3A into a thick character as shown in the center in FIG. 3A. Note that some users may think that the line of the character after the enlargement process is too thick. In this case, a correction process of correcting the contour section of the character is performed, thereby deforming (correcting) the thick character shown in the center in FIG. 3A into a character with a line having an appropriate thickness as shown on the right in FIG. 3A. A series of contour processes including the enlargement process and the correction process is performed to obtain the process result according to the intention of a user.

Figure 3B:
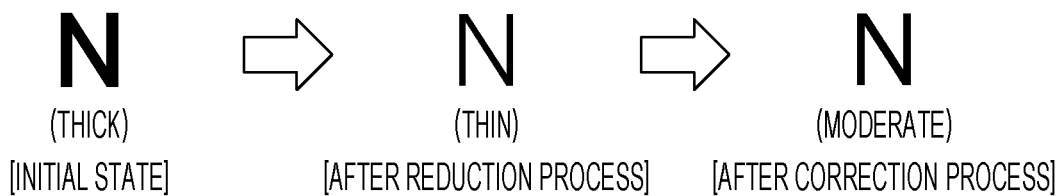

In contrast, assume that there is a relatively thick character "N" as shown, for example, on the left in FIG. 3B. In this case, a reduction process of reducing the contour section of the character is performed, thereby deforming the thick character shown on the left in FIG. 3B into a thin character as shown in the center in FIG. 3B. Note that some users may think that the line of the character after the reduction process is too thin. In this case, a correction process is performed, thereby deforming the thin character shown in the center in FIG. 3B into a character with a line having an appropriate thickness as shown on the right in FIG. 3B. A series of contour processes including the reduction process and the correction process is performed to obtain the process result according to the intention of a user.

Figure 3C:
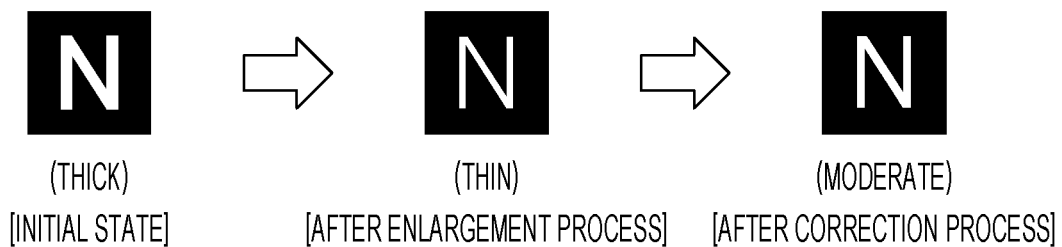

Moreover, assume that there is a relatively thick hollow character "N" as shown, for example, on the left in FIG. 3C. In this case, an enlargement process is performed to enlarge the contour section in a background area, thereby deforming the thick hollow character shown on the left in FIG. 3D into a thin hollow character as shown in the center in FIG. 3C. Note that some users may think that the line of the hollow character after the enlargement process is too thin. In this case, a correction process is performed, thereby deforming the thin hollow character shown in the center in FIG. 3C into a hollow character with a line having an appropriate thickness as shown on the right in FIG. 3C. That is, a process result according to the intention of a user can be obtained also for the hollow character.

Figure 3D:
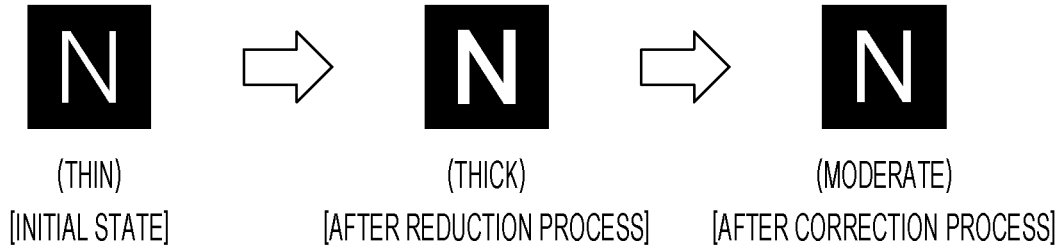

Moreover, assume that there is a relatively thin hollow character "N" as shown, for example, on the left in FIG. 3D. In this case, a reduction process is performed to reduce the contour section in a background area, thereby deforming the thin hollow character shown on the left in FIG. 3D into a thick hollow character as shown in the center in FIG. 3D. Note that some users may think that the line of the hollow character after the reduction process is too thick. In this case, a correction process is performed, thereby deforming the thick hollow character shown in the center in FIG. 3D into a hollow character with a line having an appropriate thickness as shown on the right in FIG. 3D. Thus, a process result according to the intention of a user can be obtained.

Figure 4A:
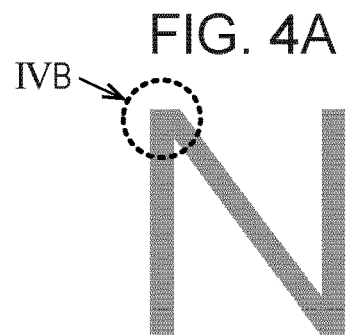
FIG. 4A is a view illustrating an example of a character as an object in the first embodiment.
Figure 4B:
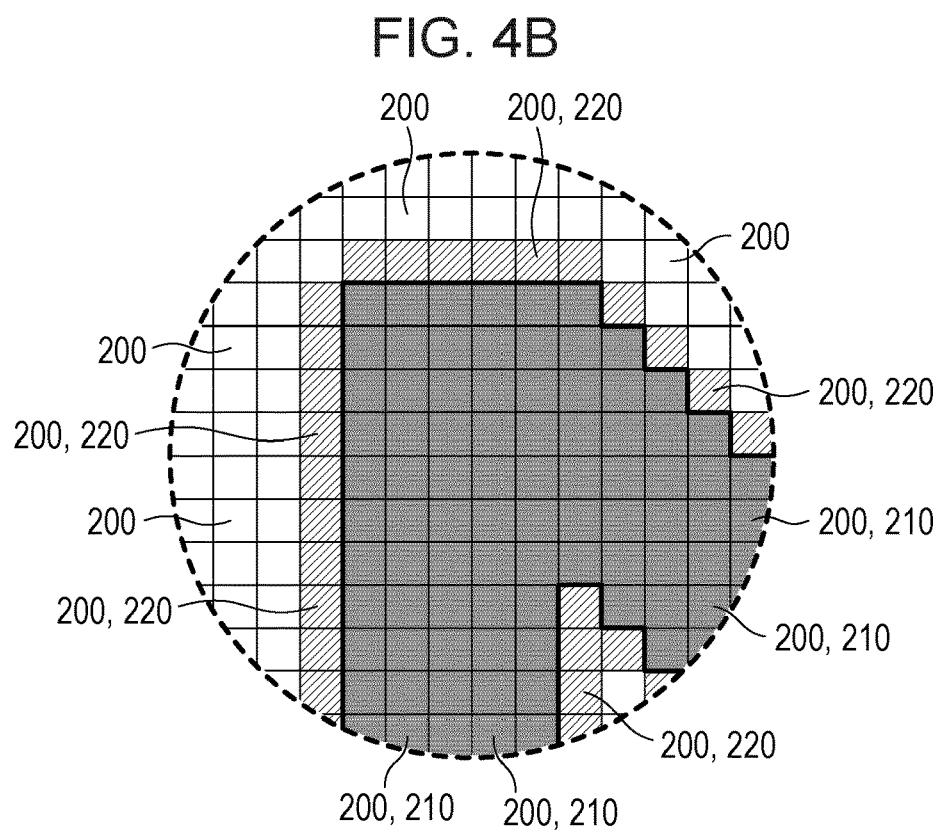
FIG. 4B is a view illustrating target pixels in a case of an enlargement process in the first embodiment.

The procedure of the contour process including the enlargement process shown in FIG. 3A will be more specifically described with reference to FIGS. 4A to 4C. That is, a part of the character "N" shown in FIG. 4A surrounded by the broken line circle IVB is enlarged in FIG. 4B. As illustrated in FIG. 4B, the character as the object includes a plurality of pixels 200, 200, . . . . Strictly speaking, the character as the object includes pixels 210, 210, . . . each having a gray scale value as the pixel value larger than a prescribed threshold value. Note that the threshold value is prescribed for each type of the objects.

Here, in the enlargement process of the character as the object, an interface between each of the pixels 210 forming the character and each of the other pixels 200, that is, the pixels 200 included in the background region of the pixels 200, 200, . . . is detected as the contour section of the character. Of the pixels 200, 200, . . . included in the background region, pixels forming the contour section of the character as the object, that is, pixels adjacent to the pixels 210 forming the character are identified as the target pixels 220. Then, the gray scale value of each target pixel 220 is changed, thereby performing the enlargement process. Moreover, also in the correction process, the pixel value of each target pixel 220 is changed.

Figure 4C:
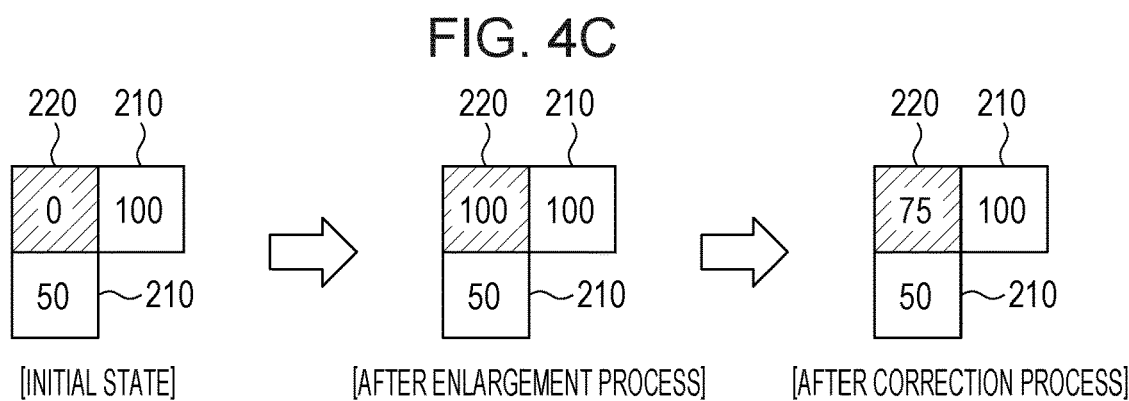
FIG. 4C is a view specifically illustrating a procedure of a contour process including the enlargement process in the first embodiment.

For example, as shown on the left in FIG. 4C, it is assumed that the gray scale value of a target pixel 220 is 0 in an initial state before the enlargement process is performed. It is also assumed that the pixels 210, 210, . . . forming the character as the object include two pixels 210 each adjacent to the target pixel 220, and the gray scale values of the two adjacent pixels 210 are assumed to be 100 and 50. In this case, according to the enlargement process, as illustrated in the center in FIG. 4C, the gray scale value of the target pixel 220 is changed to the largest gray scale value of the gray scales of the adjacent pixels 210 adjacent thereto, that is, to a gray scale value of 100. As a result, the thin character shown on the left in FIG. 3A is changed into the thick character shown in the center in FIG. 3A. Note that in the case of only one adjacent pixel 210, the gray scale value of the target pixel 220 is changed to the gray scale value of the only one adjacent pixel 210.

Moreover, according to the correction process, as illustrated on the right in FIG. 4C, the gray scale value of the target pixel 220 is multiplied by a prescribed ratio, and thereby the gray scale value is moderately reduced. On the right in FIG. 4C, a state where the gray scale value of the target pixel 220 is reduced from 100 to 75 by being multiplied by a ratio of 3/4 is shown. As a result, the thick character shown in the center in FIG. 3A is deformed into the character with the line having an appropriate thickness as shown on the right in FIG. 3A. Thus, a process result according to the intention of a user can be obtained. Note that as used herein, the term "ratio", a so-called "correction level" as the degree of correction process is arbitrarily changeable in accordance with a user operation as described later.

Next, the procedure of the contour process including the reduction process shown in FIG. 3B will be more specifically described with reference to FIG. 5A to 5C. That is, a part of the character "N" shown in FIG. 5A surrounded by the broken line circle VB is enlarged in FIG. 5B. As illustrated in FIG. 5B, the character as the object includes a plurality of pixels 200, 200, . . . . Strictly speaking, the character as the object includes pixels 210, 210, . . . each have a gray scale value as the pixel value larger than the threshold value.

Here, in the reduction process of the character as the object, an interface between each of pixels 210 forming the character and each of the pixels 200 included in the background region of the pixels 200, 200, . . . is detected as the contour section of the character. Note that in the reduction process, of the pixels 210, 210, . . . included in the character as the object, pixels forming the contour section of the character, that is, pixels adjacent to the pixels 200 included in the background region are identified as the target pixels 220. Then, the gray scale value of each target pixel 220 is changed, thereby performing the reduction process. Moreover, also in the correction process, the pixel value of each target pixel 220 is changed.

For example, as shown on the left in FIG. 5C, it is assumed that the gray scale value of a target pixel 220 is 100 in an initial state before the reduction process is performed. It is also assumed that the pixels 210, 210, . . . forming the character as the object include two pixels 210 each adjacent to the target pixel 220, and the gray scale values of the two adjacent pixels 210 are assumed to be 100 and 50. In this case, according to the reduction process, as illustrated in the center in FIG. 5C, the gray scale value of the target pixel 220 is changed to the smallest gray scale value of the gray scale values of the adjacent pixels 210 adjacent thereto, that is, to a gray scale value of 50. As a result, the thick character shown on the left in FIG. 3B is changed into the thin character shown in the center in FIG. 3B. Note that in the case of only one adjacent pixel 210, the gray scale value of the target pixel 220 is changed to the gray scale value of the only one adjacent pixel 210.

Moreover, according to the correction process in this case, as illustrated on the right in FIG. 5C, the gray scale value of the target pixel 220 is multiplied by a prescribed ratio, and thereby the gray scale value is moderately increased. On the right in FIG. 5C, a state where the gray scale value of the target pixel 220 is increased from 50 to 75 by being multiplied by a ratio of 3/2 is shown. As a result, the thin character shown in the center in FIG. 3B is deformed into the character with the line having a appropriate thickness shown on the right in FIG. 3B. Thus, a process result according to the intention of a user can be obtained.

Figure 6A:
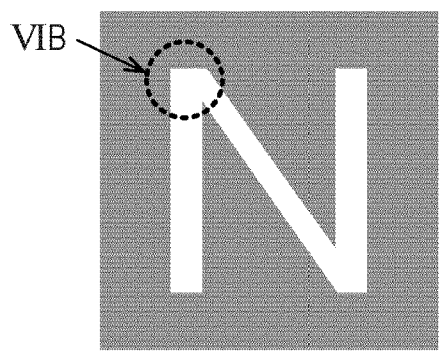
FIG. 6 is a view illustrating an example of a hollow character as an object in the first embodiment.
FIG. 6B is a view illustrating target pixels in a case of an enlargement process in the first embodiment.
FIG. 6C is a view specifically illustrating a procedure of a contour process including the enlargement process on a hollow character in the first embodiment.
Figure 6B:
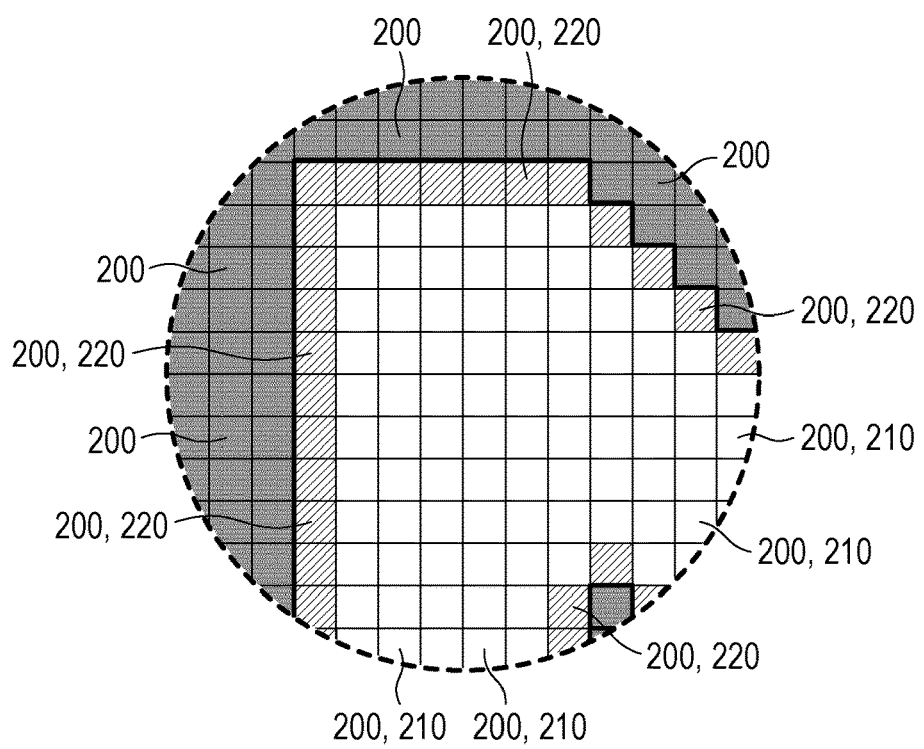

Next, the procedure of the contour process including the enlargement process of the hollow character shown in FIG. 3C will be more specifically described with reference to FIGS. 6A to 6C. That is, a part of the hollow character "N" shown in FIG. 6A surrounded by the broken line circle VIB is enlarged in FIG. 6B. As illustrated in FIG. 6B, the hollow character as the object includes a plurality of pixels 200, 200, . . . and strictly speaking, includes pixels 210, 210, . . . each having a gray scale value as the pixel value smaller than or equal to the threshold value.

Here, also in the enlargement process of the hollow character as the object, an interface between each of the pixels 210 forming the hollow character and each of the pixels 200 included in the background region of the pixels 200, 200, . . . is detected as the contour section of the hollow character. In the enlargement process, of the pixels 210, 210, . . . included in the hollow character as the object, pixels forming the contour section of the hollow character, that is, pixels adjacent to the pixels 200 included in the background region are identified as the target pixels 220. Then, the gray sole value of each target pixel 220 is changed, thereby performing the enlargement process. Moreover, also in the correction process, the pixel value of each target pixel 220 is changed.

Figure 6C:
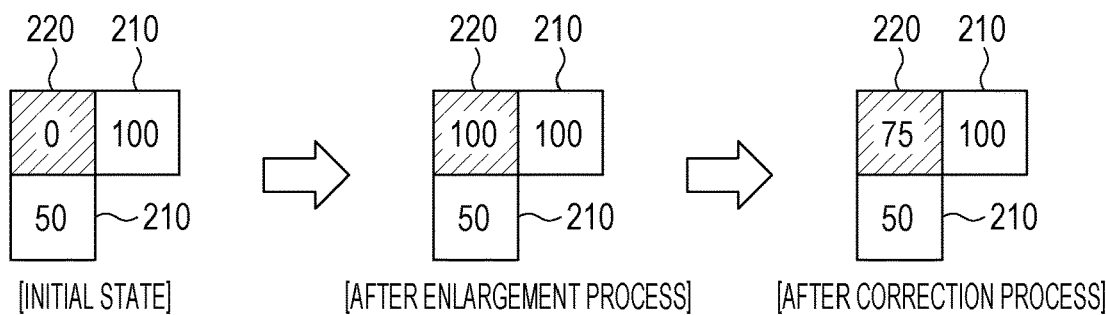

For example, as shown on the left in FIG. 6C, it is assumed that the gray scale value of a target pixel 220 is 0 in an initial state before the enlargement process is performed. It is also assumed that the pixels 210, 210, . . . forming the hollow character as the object include two pixels 210 each adjacent to the target pixel 220, and the gray scale values of the two adjacent pixels 210 are assumed to be 100 and 50. In this case, according to the enlargement process, as illustrated in the center in FIG. 6C, the gray scale value of the target pixel 220 is changed to the largest gray scale value of the gray scales of the adjacent pixels 210 adjacent thereto, that is, to a gray scale value of 100. As a result, the thick hollow character shown on the left in FIG. 3C is changed into the thin hollow character as shown in the center in FIG. 3C. Note that in the case of only one adjacent pixel 210, the gray scale value of the target pixel 210 is changed to the gray scale value of the only one adjacent pixel 210.

Moreover, according to the correction process in this case, as illustrated on the right in FIG. 6C, the gray scale value of the target pixel 220 is multiplied by a prescribed ratio, and thereby the gray scale value is moderately reduced. On the right in FIG. 6C, a state where the gray scale value of the target pixel 220 is reduced from 100 to 75 by being multiplied by a ratio of 3/4 is shown. As a result, the thin hollow character shown in the center in FIG. 3C is deformed into the hollow character with the line having an appropriate thickness shown on the right in FIG. 3C. Thus, a process result according to the intention of a user can be obtained.

Figure 7A:
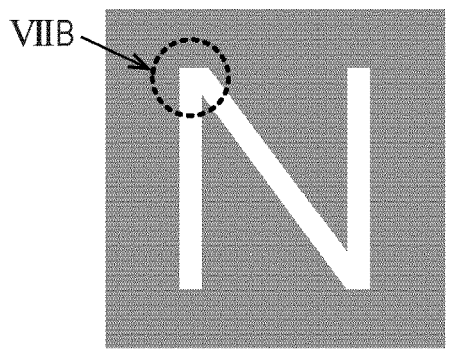
FIG. 7A is a view illustrating an example of a hollow character as an object in the first embodiment.
Figure 7B:
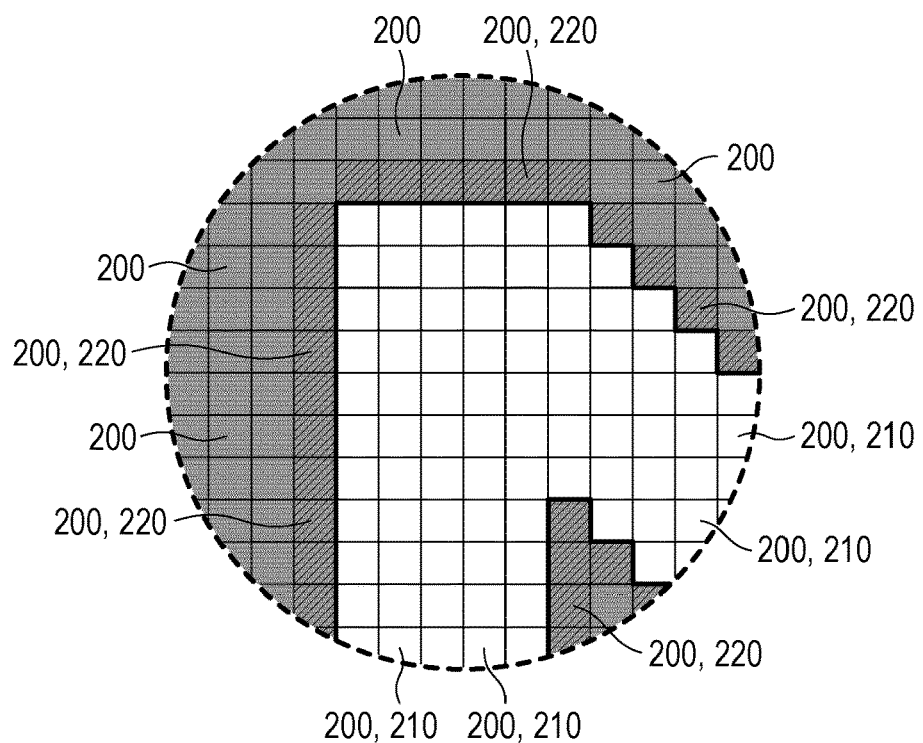
FIG. 7B is a view illustrating target pixels in a case of a reduction process in the first embodiment.

Next, the procedure of the contour process including the reduction process of the hollow character shown in FIG. 3D will be more specifically described with reference to FIGS. 7A to 7C. That is, a part of the hollow character "N" shown in FIG. 7A surrounded by the broken line circle VIIB is enlarged in FIG. 7B. As illustrated in FIG. 7B, the hollow character as the object includes a plurality of pixels 200, 200, . . . and strictly speaking, includes pixels 210, 210, . . . each having a gray scale value as the pixel value smaller than or equal to the threshold value.

Here, also in the reduction process of the hollow character as the object, an interface between each of pixels 210 forming the hollow character and each of the pixels 200 included in the background region of the pixels 200, 200, . . . is detected as the contour section of the hollow character. Note that in this reduction process, of the pixels 200, 200, . . . included in the background region, pixels forming the contour section of the hollow character, that is, pixels adjacent to the pixels 210 forming the hollow character are identified as the target pixels 220. Then, the gray scale value of each target pixel 220 is changed, thereby performing the reduction process. Moreover, also in the correction process, the pixel value of each target pixel 220 is changed.

Figure 7C:
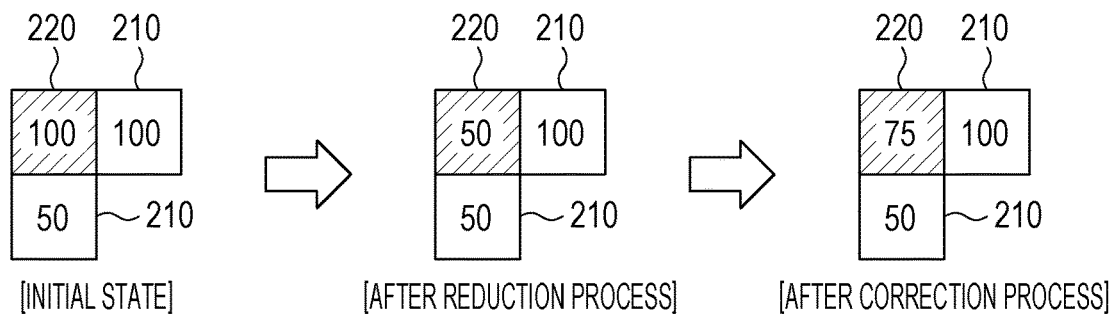
FIG. 7C is a view specifically illustrating a procedure of a contour process including the reduction process on a hollow character in the first embodiment.

For example, as shown on the left in FIG. 7C, it is assumed that the gray scale value of a target pixel 220 is 100 in an initial state before the reduction process is performed. It is also assumed that the pixels 200, 200, . . . included in the background region includes two pixels 210 each adjacent to the target pixel 220, and the gray scale values of the two adjacent pixels 210 are assumed to be 100 and 50. In this case, according to the reduction process, as illustrated in the center in FIG. 7C, the gray scale value of the target pixel 220 is changed to the smallest gray scale value of the gray scale values of the adjacent pixels 210 adjacent thereto, that is, to a gray scale value of 50. As a result, the thin hollow character shown on the left in FIG. 3D is changed into the thick hollow character shown in the center in FIG. 3D. Note that in the case of only one adjacent pixel 210, the gray scale value of the target pixel 210 is changed to the gray scale value of the only one adjacent pixel 210.

Moreover, according to the correction process in this case, as illustrated on the right in FIG. 7C, the gray scale value of the target pixel 220 is multiplied by a prescribed ratio, and thereby the gray scale value is moderately reduced. On the right in FIG. 7C, a state where the gray scale value of the target pixel 220 is increased from 50 to 75 by being multiplied by a ratio of 3/2 is shown. As a result, the thick hollow character shown in the center in FIG. 3D is deformed into the hollow character with the line having an appropriate thickness shown on the right in FIG. 3D. Thus, a process result according to the intention of a user can be obtained.

Note that as the correction level which is the degree of the correction process, for example, a total of five levels −2, −1, 0, +1, and +2 are provided as illustrated in FIG. 8. Among them, according to the correction level −2, multiplication by a ratio of 1/2 is performed, that is, the gray scale value of the target pixel 220 is reduced by 50%. According to the correction level −1" multiplication by a ratio of 3/4 is performed, that is, the gray scale value of the target pixel 220 is reduced by 25%. Moreover, according to the correction level 0, division by a ratio of 1 is performed, that is, this leads to a result similar to a case where no correction process is performed. According to the correction level +1, multiplication by a ratio of 5/4 is performed, that is, the gray scale value of the target pixel 220 is increased by 25%. According to the correction level +2, multiplication by a ratio of 3/2 is performed, that is, the gray scale value of the target pixel 220 is increased by 50%.

Note that on the right in FIG. 4C, a result of the correction process performed at the correction level −1 is shown. When the correction process is performed at, for example, the correction level −2 instead of the correction level −1, the line of the character after the correction process becomes thinner than that shown on the right in FIG. 3A. In contrast, for example, when the correction process is performed at the correction level +1 or +2, the line of the character after the correction process becomes thicker than that of the character after the enlargement process shown in the center in FIG. 3A.

Note that on the right in FIG. 5C, a result of the correction process performed at the correction level +2 is shown. When the correction process is performed at, for example, a correction level +1 instead of the correction level +2, the line of the character after the correction process becomes thicker than that shown on the right in FIG. 3B. In contrast, for example, when the correction process is performed at the correction level −1 or −2, the line of the character after the correction process becomes thinner than that of the character after the enlargement process shown in the center in FIG. 3B.

Moreover, on the right in FIG. 6C, a result of the correction process performed at the correction level −1 is shown. When the correction process is performed at, for example, the correction level −2 instead of the correction level −1, the line of the hollow character after the correction process becomes thicker than that shown on the right in FIG. 3C. In contrast, for example, when the correction process is performed at the correction level +1 or +2, the line of the hollow character after the correction process becomes thinner than that of the character after the enlargement process shown in the center in FIG. 3C.

Note that on the right in FIG. 7C, a result of the correction process performed at the correction level +2 is shown. When the correction process is performed at, for example, a correction level of +1 instead of the correction level +2, the line of the hollow character after the correction process becomes thicker than that shown on the right in FIG. 3D. In contrast, for example, when the correction process is performed at the correction level −1 or −2, the line of the character after the correction process is much thicker than that of the character after the enlargement process shown in the center in FIG. 3B.

The series of contour processes including the enlargement process and the correction process and the series of contour processes including the reduction process and the correction process are applicable to outlined characters other than the hollow character in a similar manner. Moreover, the contour processes are applicable not only to the characters and outlined characters but also to figures, outlined figures, photographs, and outlined photographs in a similar manner. For each type of objects, namely, the character, the outlined character, the figure, the outlined figure, the photograph, and the outlined photograph, it is possible to arbitrarily set either the enlargement process or the reduction process and it is possible to arbitrarily set the correction level. The settings are performed by using the preview screen 100 shown in FIG. 9. Note that the preview screen 100 is controlled by a control unit 20 and is displayed on a display surface of the display of the operation display unit 22.

Figure 9:
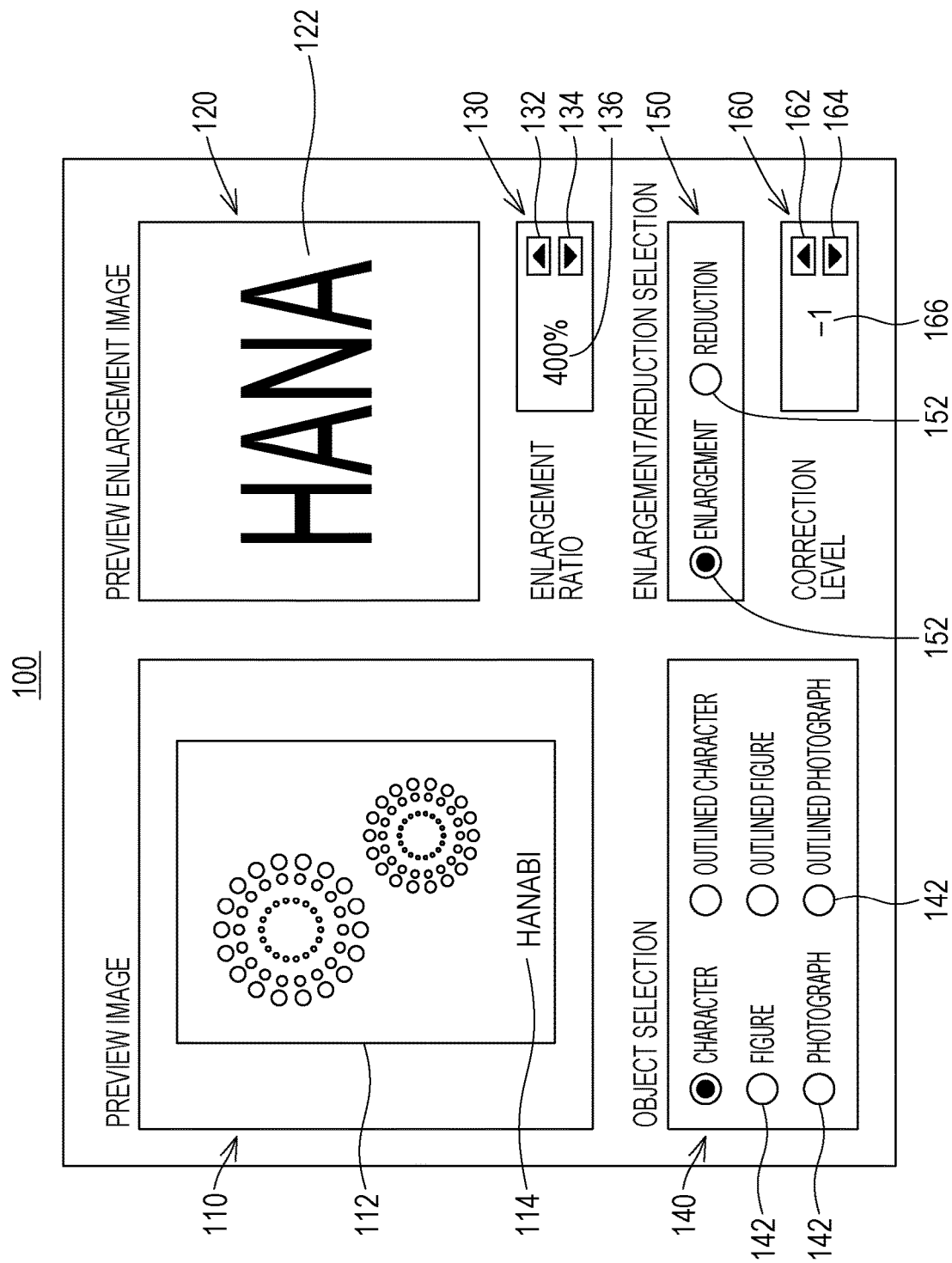
FIG. 9 is a view illustrating an example of a preview screen displayed on an operation display unit in the first embodiment.

As illustrated in FIG. 9, the preview screen 100 includes a preview image display area 110, a preview enlargement display area 120, a preview enlargement ratio setting area 130, an object selection area 140, an enlargement/reduction selection area 150, and a correction level setting area 160. Among them, the preview image display area 110 displays a preview image 112 based on image data to be subjected to the contour process. The preview enlargement display area 120 displays a preview enlarged image 122 obtained by enlarging a part of the preview image 112. Note that the preview enlarged image 122 shown in FIG. 9 is an enlarged image of a part including characters 114 of "HANA" in the preview image 112.

The preview enlargement ratio setting area 130 is provided with two arrow buttons 132 and 134 respectively indicating the upward direction and the downward direction. The arrow buttons 132 and 134 are operated by a user, thereby changing the enlargement ratio of the preview enlarged image 122. Moreover, in the preview enlargement ratio setting area 130, a character string 136 indicating the enlargement ratio of the preview enlarged image 122 is displayed. Note that the character string 136 in FIG. 9 describes that the enlargement ratio of the preview enlarged image 122 is 400%.

The object selection area 140 includes six radio buttons 142, 142, . . . corresponding to the types of objects, namely, the character, the outlined character, the figure, the outlined figure, the photograph, and the outlined photograph. The six radio buttons 142, 142, . . . are operated by a user, and thereby, the type of the object to be subjected to a setting corresponding to the enlargement process or the reduction process and a setting of the correction level is selected. Note that FIG. 9 shows that the character is selected as the type of the object to be subjected to the settings.

The enlargement/reduction selection area 150 includes two radio buttons 152 and 152 corresponding to the enlargement process and the reduction process. The two radio buttons 152 and 152 are operated by a user, and thereby the enlargement process or the reduction process to be performed is set. Note that FIG. 9 shows that the enlargement process is set.

Similarly to the preview enlargement ratio setting area 130, the correction level setting area 160 includes two arrow buttons 162 and 164 indicating the upward direction and the downward direction. The arrow buttons 162 and 164 are operated by a user, and thereby, the correction level in the correction process is set. Moreover, in the correction level setting area 160, a character string 166 describing the correction level thus set is displayed. Note that the character string 166 in FIG. 9 describes that the correction level −1 is set.

The control unit 20 configured to display the preview screen 100 on the display surface of the display of the operation display unit 22, that is, the control unit 20 configured to generate display screen data for displaying the preview screen 100 is an example of a preview image data generation means according to the present disclosure. The display screen data includes preview image data for displaying the preview image 112 and preview enlargement image data for displaying the preview enlarged image 122. Contents set by using the preview screen 100 are stored as the contour process setting data 448 in the main storage unit 20a (data storage region 44). Moreover, the result of the contour process is reflected by the preview image 112 and the preview enlarged image 122. Thus, a user can recognize the result of the contour process with reference to the preview image 112 and the preview enlarged image 122.

The contour process is performed by the image processing unit 14. Components configured to perform the contour process in the image processing unit 14 are conceptually illustrated in FIG. 10.

Figure 10:
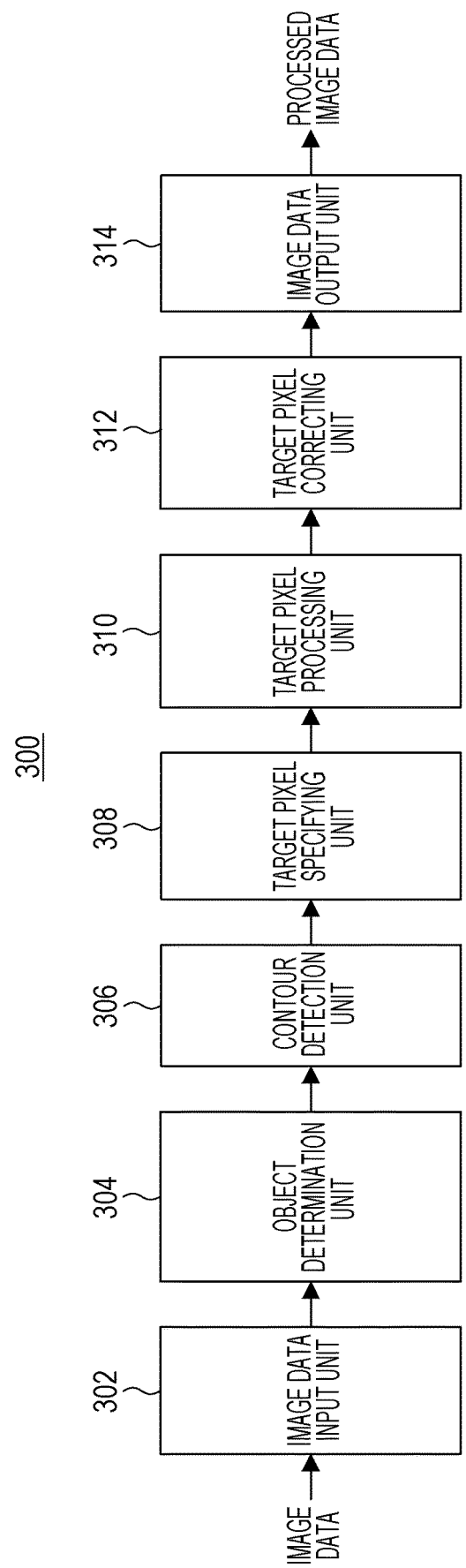
FIG. 10 is a view conceptually illustrating a configuration of a component configured to perform the contour process by an image processing unit in the first embodiment.

That is, the image processing unit 14 is included in a contour process unit 300 configured to perform the contour process. As illustrated in FIG. 10, the contour process unit 300 includes an image data input unit 302 to which image data to be subjected to the contour process is input. The image data input to the image data input unit 302 is, for example, bitmap data. The image data input to the image data input unit 302 is input to an object determination unit 304 serving as an input object determination means.

The object determination unit 304 determines, based on tag information of each pixel included in bitmap data as the image data input from the image data input unit 302, the type of the object to which the pixel belongs. The image data (each pixel) after the determination process performed by the object determination unit 304 is input to a contour detection unit 306 as a contour detection means.

The contour detection unit 306 detects, for each object, the interface of the object in accordance with the procedure described with reference to FIGS. 4 to 7. The image data after the detection process performed by the contour detection unit 306 is input to a target pixel specifying unit 308 serving as a target pixel specifying means.

The target pixel specifying unit 308 specifies the target pixel 220 in accordance with the procedure described with reference to FIGS. 4 to 7, strictly speaking, in accordance with the type of the object and the content of the process regarding whether the enlargement process or the reduction process is performed. Note that the type of the object and the content of the process regarding whether the enlargement process or the reduction process is performed are recognized with reference to the contour process setting data 448. The image data after the specifying process performed by the target pixel specifying unit 308 is input to a target pixel processing unit 310 serving as a target pixel processing means.

The target pixel processing unit 310 performs the enlargement process or reduction process for each object in accordance with the procedure described with reference to FIGS. 4 to 7. Then, the image data after the enlargement process or the reduction process performed by the target pixel processing unit 310 is input to a target pixel correcting unit 312 serving as a target pixel correcting means.

The target pixel correcting unit 312 performs the correction process for each object in accordance with the procedure described with reference to FIGS. 4 to 7. The image data after the correction process performed by the target pixel correcting unit 312 is input to an image data output unit 314.

The image data output unit 314 outputs, as processed image data, the image data input from the target pixel correcting unit 312, that is, the image data after the series of contour processes is performed. The processed image data is transmitted to appropriate elements of the image forming unit 16, the communication unit 18, the control unit 20, the auxiliary storage unit 24, and the external recording medium connection unit 26.

Figure 11:
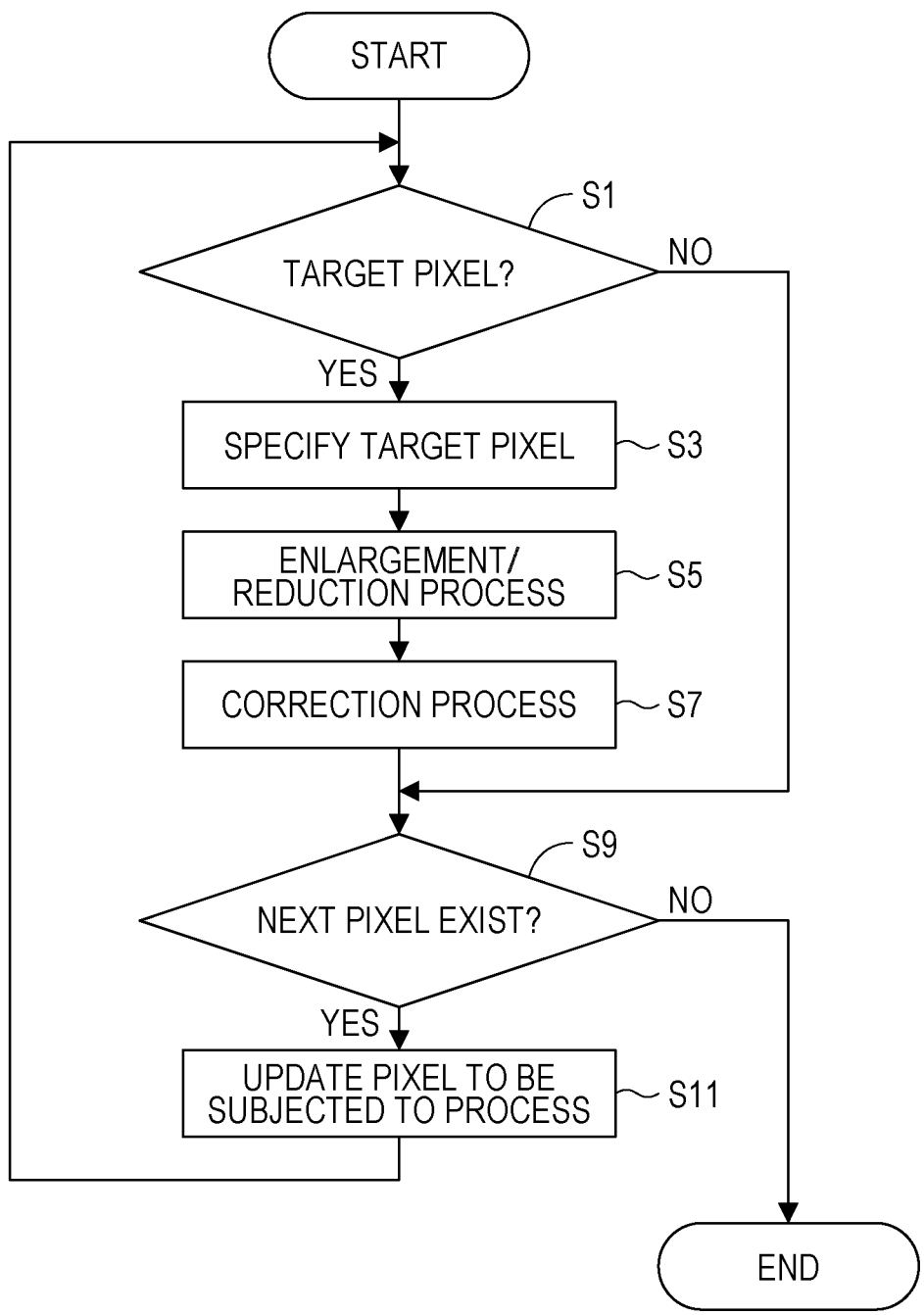
FIG. 11 is a flow chart illustrating a flow of processes by some of components configured to perform the contour process by the image processing unit in the first embodiment.

The flow of processes performed, in particular, by the target pixel specifying unit 308, the target pixel processing unit 310, and the target pixel correcting unit 312 of the contour process unit 300 is illustrated, for example, as a flow chart in FIG. 11. The series of processes illustrated in the flow chart in FIG. 11 is performed on each pixel of the image data sequentially.

First, in step S1, it is determined whether or not a pixel as a current process target is the target pixel 220, that is, whether or not a pixel as a current process target satisfies the condition for the target pixel 220. In this embodiment, for example, if it is determined that the pixel is the target pixel (S1: YES), the process proceeds to step S3.

In step S3, the pixel as the current process target is identified as the target pixel 220. Then, the process proceeds to step S5.

In step S5, the enlargement process or the reduction process is performed on the target pixel 220 in accordance with the object to which the target pixel 220 belongs. Then, the process proceeds to step S7.

In step S7, the correction process is performed on the target pixel 220 after the enlargement process or the reduction process performed in step S5 in accordance with the type of the object to which the target pixel 220 belongs. Then, the process proceeds to step S9.

In step S9, it is determined whether or not a next image data exists, that is, whether or not the series of processes shown in the flow chart in FIG. 11 has not been ended for all pixels included in the image data. In this embodiment, for example, if the next pixel exists (S9: YES), the process proceeds to step S11.

In step S11, the next pixel is determined as a new process target, that is, a pixel to be subjected to the process is updated. Then, the process returns to step S1.

Note that in step S1, if the pixel as the current process target is not identified as the target pixel 220 (S1: NO), the process proceeds to step S9. Then, in step S9, if the next pixel does not exist (step S9: NO), the series of processes shown in the flow chart in FIG. 11 ends.

In this embodiment, FIGS. 12A to 12D show evaluation results by the contour process in the first embodiment, specifically, evaluation results of the legibility (appearance) of the preview image 112, the preview enlarged image 122, and the like on the display image. For example, FIG. 12A shows an evaluation result for thickening of a character, a line, or a figure as the object. In evaluation example 1-1, the correction process is performed at the correction level −1 after the enlargement process is performed. According to the evaluation example 1-1, a good result (which is represented by "◯") is obtained for each of the character, the line, and the figure. That is, the line has a moderate thickness for each of the character, the line, and the figure. In evaluation example 1-2, the correction process is performed at the correction level −2 after the enlargement process is performed. According to the evaluation example 1-2, a good evaluation result is obtained for each of the character, the line, and the figure. Note that comparison example 1-1 is an example in which neither the enlargement process nor the reduction process is performed, and the correction process is not performed. According to the comparison example 1-1, an unfavorable result (which is represented by "x") is necessarily obtained for each of the character, the line, and the figure. Comparison example 1-2 is an example in which only the enlargement process is performed and the correction process is not performed. According to the comparison example 1-2, the line of each of the character, the line, and the figure seems to become too thick, and the comparison example 1-2 leads an unsatisfactory (mediocre) result (which is represented by "Δ").

FIG. 12B shows an evaluation result for thinning of a character, a line, or a figure as the object. In evaluation example 2-1, the correction process is performed at the correction level +1 after the reduction process is performed. According to the evaluation example 2-1, a good result is obtained for each of the character, the line, and the figure. That is, the line has a moderate thickness for each of the character, the line, and the figure. In evaluation example 2-2, the correction process is performed at a correction level of +2 after the reduction process is performed. According to the evaluation example 2-2, a good evaluation result is obtained for each of the character, the line, and the figure. Note that comparison example 2-1 is an example in which neither the enlargement process nor the reduction process is performed and the correction process is not performed. According to the comparison example 2-1, an unfavorable result is necessarily obtained for each of the character, the line, and the figure. Comparison example 2-2 is an example in which only the reduction process is performed and the correction process is not performed. The comparison example 2-2 seems that the line of each of the character, the line, and the figure also becomes too thin, and the comparison example 2-2 leads to an unsatisfactory result.

FIG. 12C shows an evaluation result for thinning of an outlined character, an outlined line, or an outlined figure as the object. In evaluation example 3-1, the correction process is performed at the correction level −1 after the enlargement process is performed. According to the evaluation example 3-1, a good result is obtained for each of the outlined character, the outlined line, and the outlined figure. In evaluation example 3-2, the correction process is performed at the correction level −2 after the enlargement process is performed. According to the evaluation example 3-2, a good evaluation result is obtained for each of the outlined character, the outlined line, and the outlined figure. Note that comparison example 3-1 is an example in which neither the enlargement process nor the reduction process is performed and the correction process is not performed. According to the comparison example 3-1, an unfavorable result is necessarily obtained for each of the outlined character, the outlined line, and the outlined figure. Comparison example 3-2 is an example in which only the reduction process is performed and the correction process is not performed. According to the comparison example 3-2, an unsatisfactory result is obtained for each of the outlined character, the outlined line, and the outlined figure.

FIG. 12D shows an evaluation result for thickening of an outlined character, an outlined line, or an outlined figure as the object. In evaluation example 4-1, the correction process is performed at the correction level +1 after the reduction process is performed. According to the evaluation example 4-1, a good result is obtained for each of the outlined character, the outlined line, and the outlined figure. In evaluation example 4-2, the correction process is performed at a correction level of +2 after the reduction process is performed. According to the evaluation example 4-2, a good evaluation result is obtained for each of the outlined character, the outlined line, and the outlined figure. Note that comparison example 4-1 is an example in which neither the enlargement process nor the reduction process is performed and the correction process is not performed. According to the comparison example 4-1, an unfavorable result is necessarily obtained for each of the outlined character, the outlined line, and the outlined figure. Comparison example 4-2 is an example in which only the reduction process is performed and the correction process is not performed. According to the comparison example 4-2, an unsatisfactory result is obtained for each of the outlined character, the outlined line, and the outlined figure.

Moreover, the contour process in the first embodiment is also reflected by the image formation process by the image forming unit 16, that is, also reflected by the image to be formed on the image recording medium. The evaluation result by the image formation process is shown in FIGS. 13A to 13D. FIG. 13A shows an evaluation result for thickening of a character, a line, or a figure as the object. FIG. 13B shows an evaluation result for thinning a character, a line, or a figure as the object. FIG. 13C shows an evaluation result for thinning an outlined character, an outlined line, or an outlined figure as the object. FIG. 13D shows an evaluation result for thickening of an outlined character, an outlined line, or an outlined figure as the object.

As can be seen from the evaluation results shown in FIGS. 13A to 13D, results similar to the evaluation results shown in FIGS. 12A to 12D are obtained also in the image formation process by the image forming unit 16. In particular, in the image formation process, the result of the contour process appears in accordance with an output of level light by the LSU 26, that is, the density of an image formed on the image recording medium. That is, the density of the contour section of each object is changed without changing a screen pattern. Thus, a good result without jaggies (aliasing) is obtained.

As described above, according to the first embodiment, when the enlargement process or the reduction process is performed on the contour section of each object included in an image based on the image data, it is possible to obtain a good process result according to the intention of a user. Moreover, it is also possible to perform the enlargement process or the reduction process on a contour section of a positive/negative-reversed object such as an outlined character or an outlined line and to obtain a good process result according to the intention of a user.

Note that in the first embodiment, five correction levels are prepared as illustrated in FIG. 8, but this is not construed as limitation. That is, the number of correction levels may be other than five.

Instead of the exposure apparatus including an LSU 16a, an LED exposure apparatus using a light emitting diode (LED) as a light emitting device may be adopted. Also in this case, the output of the light emitting diode as the light emitting device is controlled based on the PWM control system.

The image data may be gray scale data or color data.

The present disclosure may be applied to, not the enlargement process and the reduction process, but an edge enhancement process as in the technique disclosed, for example, in Japanese Unexamined Patent Application Publication No. 2015-23445. That is, the correction process may be performed after the edge enhancement process is performed.

Second Embodiment

As a second embodiment of the present disclosure, an example in which the present disclosure is applied to a printer as an image forming apparatus is considered. That is, also when the present disclosure is applied to the printer, similarly to the first embodiment, it is also possible to perform the enlargement process or the reduction process on a contour section of each object included in an image formed in the image recording medium and to obtain a good process result according to the intention of a user.

Third Embodiment

As a third embodiment of the present disclosure, an example in which the present disclosure is applied to a personal computer as an image processing apparatus is considered. That is, also when the present disclosure is applied to the personal computer, similarly to the first embodiment, it is also possible to perform the enlargement process or the reduction process on a contour section of each object included in the image displayed on a screen of the personal computer and to obtain a good process result according to the intention of a user.

Each of the above-described embodiments is a specific example of the present disclosure, and does not limit the technical scope of the present disclosure. The present disclosure is applicable to aspects other than the embodiments.

The present disclosure contains subject matter related to that disclosed in Japanese Priority Patent Application JP 2017-254083 filed in the Japan Patent Office on Dec. 28, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   object determination circuitry that determines, for each object included in an image based on image data input to the object determination circuitry, a type of the object;
   target pixel specifying circuitry that specifies, for the each object, pixels forming a contour section of the object as target pixels;
   target pixel processing circuitry that performs, on a pixel value of each of some or all of the target pixels, a prescribed process according to pixel values of adjacent pixels adjacent to a corresponding one of the target pixels and the type of the object to which the corresponding one of the target pixels belongs; and
   target pixel correcting circuitry that corrects the pixel value of each of the target pixels in accordance with the type of the object to which the corresponding one of the target pixels belongs after the prescribed process performed by the target pixel processing circuitry,
   wherein the prescribed process includes an enlargement process of increasing the pixel value of each target pixel by changing the pixel value of each target pixel to a pixel value which is largest of the pixel values of the adjacent pixels.

2. The image processing apparatus according to claim 1, further comprising:
   process content setting circuitry that sets a content of the prescribed process in accordance with a user operation.

3. The image processing apparatus according to claim 1, further comprising:
   correction degree setting circuitry that sets a degree of correction by the target pixel correcting circuitry in accordance with a user operation.

4. The image processing apparatus according to claim 1, further comprising:
   preview image data generation circuitry that generates preview image data for displaying a preview image by which the pixel values of the target pixels after correction by the target pixel correcting circuitry are reflected.

5. The image processing apparatus according to claim 4, wherein
   the preview image data includes preview enlargement image data for displaying a part of the preview image in an enlarged manner.

6. An image processing method comprising:
   determining, for each object included in an image based on image data input to object determination circuitry, a type of the object;
   specifying, for the each object, pixels forming a contour section of the object as target pixels;
   processing the target pixel by performing, on a pixel value of each of some or all of the target pixels, a prescribed process according to pixel values of adjacent pixels adjacent to a corresponding one of the target pixels and the type of the object to which the corresponding one of the target pixels belongs; and
   correcting the pixel value of each of the target pixels in accordance with the type of the object to which the corresponding one of the target pixels belongs after the prescribed process performed in the processing of the target pixels,
   wherein the prescribed process includes an enlargement process of increasing the pixel value of each target pixel by changing the pixel value of each target pixel to a pixel value which is largest of the pixel values of the adjacent pixels.

7. An image forming apparatus comprising:
   the image processing apparatus according to claim 1; and
   image forming circuitry that forms an image onto an image recording medium, the image being based on output image data by which the pixel values of the target pixels corrected by the target pixel correcting circuitry are reflected.

8. The image forming apparatus according to claim 7, wherein
   the image forming circuitry forms the image based on the output image data onto the image recording medium by an electrophotographic system and includes an exposure circuitry that irradiates a photoreceptor with light at an intensity according to the pixel value of the pixel in accordance with each pixel of the image based on output image data to form an electrostatic latent image on the photoreceptor.

9. The image forming apparatus according to claim 8, wherein
   the exposure circuitry controls the intensity of the light by a PWM control system.

10. An image processing apparatus comprising:
    object determination circuitry that determines, for each object included in an image based on image data input to the object determination circuitry, a type of the object;
    target pixel specifying circuitry that specifies, for the each object, pixels forming a contour section of the object as target pixels;
    target pixel processing circuitry that performs, on a pixel value of each of some or all of the target pixels, a prescribed process according to pixel values of adjacent pixels adjacent to a corresponding one of the target pixels and the type of the object to which the corresponding one of the target pixels belongs; and
    target pixel correcting circuitry that corrects the pixel value of each of the target pixels in accordance with the type of the object to which the corresponding one of the target pixels belongs after the prescribed process performed by the target pixel processing circuitry,
    wherein the prescribed process includes a reduction process of reducing the pixel values of each target pixel by changing the pixel value of each target pixel to a pixel value which is smallest of the pixel values of the adjacent pixels.

11. The image processing apparatus according to claim 10, further comprising:

process content setting circuitry that sets a content of the prescribed process in accordance with a user operation.

12. The image processing apparatus according to claim 10, further comprising:

correction degree setting circuitry that sets a degree of correction by the target pixel correcting circuitry in accordance with a user operation.

13. The image processing apparatus according to claim 10, further comprising:

preview image data generation circuitry that generates preview image data for displaying a preview image by which the pixel values of the target pixels after correction by the target pixel correcting circuitry are reflected.

14. The image processing apparatus according to claim 13, wherein the preview image data includes preview enlargement image data for displaying a part of the preview image in an enlarged manner.

15. An image forming apparatus comprising:

the image processing apparatus according to claim 10; and image forming circuitry that forms an image onto an image recording medium, the image being based on output image data by which the pixel values of the target pixels corrected by the target pixel correcting circuitry are reflected.

16. The image forming apparatus according to claim 15, wherein the image forming circuitry forms the image based on the output image data onto the image recording medium by an electrophotographic system and includes exposure circuitry that irradiates a photoreceptor with light at an intensity according to the pixel value of the pixel in accordance with each pixel of the image based on output image data to form an electrostatic latent image on the photoreceptor.

17. The image forming apparatus according to claim 16, wherein the exposure circuitry controls the intensity of the light by a PWM control system.

\* \* \* \* \*